United States Patent [19]

Martinage

[11] 4,314,261

[45] Feb. 2, 1982

[54] APPARATUS FOR REPRODUCING AN IMAGE OF VARIABLE TONE DENSITY

[75] Inventor: Bernard Martinage, Clamart, France

[73] Assignee: Compagnie Industrielle des Telecommunications Cit-Alcatel, Paris, France

[21] Appl. No.: 175,221

[22] Filed: Aug. 4, 1980

[30] Foreign Application Priority Data

Aug. 14, 1979 [FR] France .................. 79 20658

[51] Int. Cl.³ .............................................. H04N 1/22
[52] U.S. Cl. ..................................... 346/108; 358/298
[58] Field of Search ............. 355/71; 346/107 R, 108, 346/109, 110 R, 110 V; 358/298, 299, 302

[56] References Cited

U.S. PATENT DOCUMENTS

| | | | |
|---|---|---|---|
| 3,967,894 | 7/1976 | Tsilibes ................... | 355/4 |
| 4,014,030 | 3/1977 | Stark et al. ............... | 346/160 |
| 4,110,796 | 8/1978 | Aughton .................. | 358/298 |
| 4,151,563 | 4/1979 | Gast et al. ................ | 346/108 X |

FOREIGN PATENT DOCUMENTS 2627247 12/1976 Fed. Rep. of Germany .
2358681 2/1978 France .
2385274 10/1978 France .

*Primary Examiner*—L. T. Hix
*Assistant Examiner*—W. J. Brady
*Attorney, Agent, or Firm*—Sughrue, Mion, Zinn, Macpeak and Seas

[57] ABSTRACT

An image is printed on a photo-sensitive medium in the form of an array of pixels of various tone densities. The medium (11) is moved at a constant speed in a Y direction behind a screen (10). The screen (10) has columns of apertures (13) extending in the Y direction, with the different apertures of each column being of different sizes. A beam of light of constant intensity (preferably a laser beam from a laser generator (19)) scans regularly in an X direction over the screen. The laser beam is selectively deflected by means (40) to expose the photo-sensitive medium through a selection of the apertures of each column. Since the apertures are of different sizes the exposure is different through each size and thus dots of selectable size can be printed on any point of the medium. On any one scan, the light beam is capable of exposing any number of the apertures in each column, from none to all of them.

3 Claims, 2 Drawing Figures

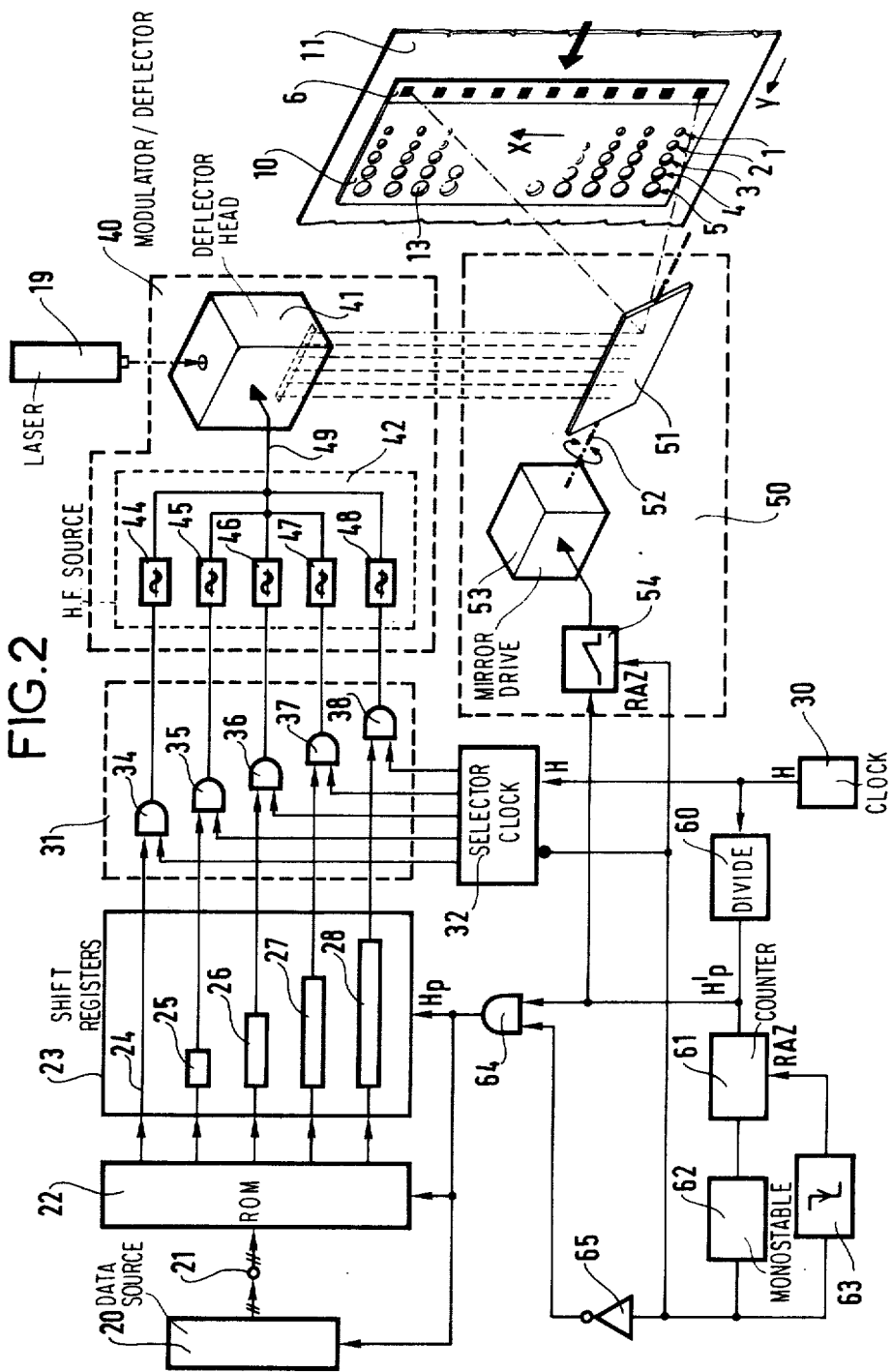

APPARATUS FOR REPRODUCING AN IMAGE OF VARIABLE TONE DENSITY

BACKGROUND OF THE INVENTION

The present invention relates to the reproduction of an image or a document having variable grey density, to obtain a result having a plurality of different grey levels starting with an image background level or reproduction medium level giving, for example, a white level (or alternatively a black level), and using two different degrees of medium colouring corresponding to black level and white level respectively, and varying the ratio between the amount of black and white in a given area allocated to each elementary image point (pixel), as a function of the desired grey level for that pixel.

An article entitled "Electronic Halftones" by R. L. Hallows, Jr., and R. J. Klensh of RCA appearing in IEEE Spectrum, October 1968, describes a system for reproducing an image in halftones wherein an image originally of varying grey density is reproduced in the form of black and white dots of different areas. In the system described, the original image is available on the screen of a first cathode ray tube (CRT), while the halftone processed image is made available on the screen of a second CRT whence it could be photographed to obtain a printer's plate. The successive dots of variable area making up the halftone image on the screen of the second CRT are composed by adding two sinusoidal voltages in quadrature to the usual horizontal and vertical deflection voltages. The amplitude of the oscillations increases with time causing the electron beam spot to describe a spiral of increasing radius about the centre of the pixel. The growth of the spiral is interrupted after a length of time corresponding to the brilliance of the corresponding pixel on the first CRT screen.

Halftone reproduction is thus obtained according to the article by moving the electron beam spot over an increasing proportion of the area allocated to each pixel thereby varying the size of the dot marked in said area.

The article "Electronic Color Separation with Laser Light Sources" by Dietrich Meyerhofer, A. Williams Stephens and John J. Walsh, appearing in IEEE Transactions on Communication Technology, vol COM-18, No. 4, August 1970, indicates that halftone images may be obtained from an intensity modulated laser beam. In the experimental device described, a laser having a Gaussian energy distribution is used together with a high gamma film medium to obtain dots whose sizes are related only to the intensity of the laser beam.

SUMMARY OF THE INVENTION

The object of the present invention is to print halftone images on a photo-sensitive medium, i.e. in the form of dots of differing sizes, while using a light beam, in particular a laser beam, whose light intensity is kept substantially constant regardless of the size of the dot to be obtained.

The present invention provides apparatus for printing an image in half-tone form on a photo-sensitive medium, the apparatus comprising:

firstly, an opaque screen having a multitude of transparent apertures in a plurality of different sizes, together with means for moving the photo-sensitive medium past the screen, the distribution of apertures and the relative motion of the medium past the screen being such that each point of the medium on which a dot of the halftone image is to be printed passes behind an aperture of each different size at least once in the course of the passage of the medium past the screen;

secondly, a source of light for producing a light beam of substantially constant intensity together with means for deflecting the light beam to any selected aperture of the screen to expose the photo-sensitive medium through the selected aperture, thereby marking a dot of a size determined by the size of the select aperture on that point of the medium which is behind the selected aperture at the time the beam falls on the aperture; and thirdly, means for receiving data representative of the tone levels of successive elementary image points (pixels) of the image to be printed, means for determining the dot size appropriate for printing the tone level of said pixel, and means for selecting an aperture of corresponding size and deflecting the light beam to fall on the selected aperture at an instant that is determined as a function of the distribution of the apertures in the screen and the motion of the medium relative thereto such that the point on the medium corresponding to the pixel to be printed is located behind the selected aperture at the time that aperture is selected.

BRIEF DESCRIPTION OF THE DRAWINGS

An embodiment of the present invention is described by way of example with reference to the accompanying drawings, in which:

FIG. 2 shows an embodiment of apparatus in accordance with the invention using the means of FIG. 1.

DESCRIPTION OF THE PREFERRED EMBODIMENTS

Figure 1:
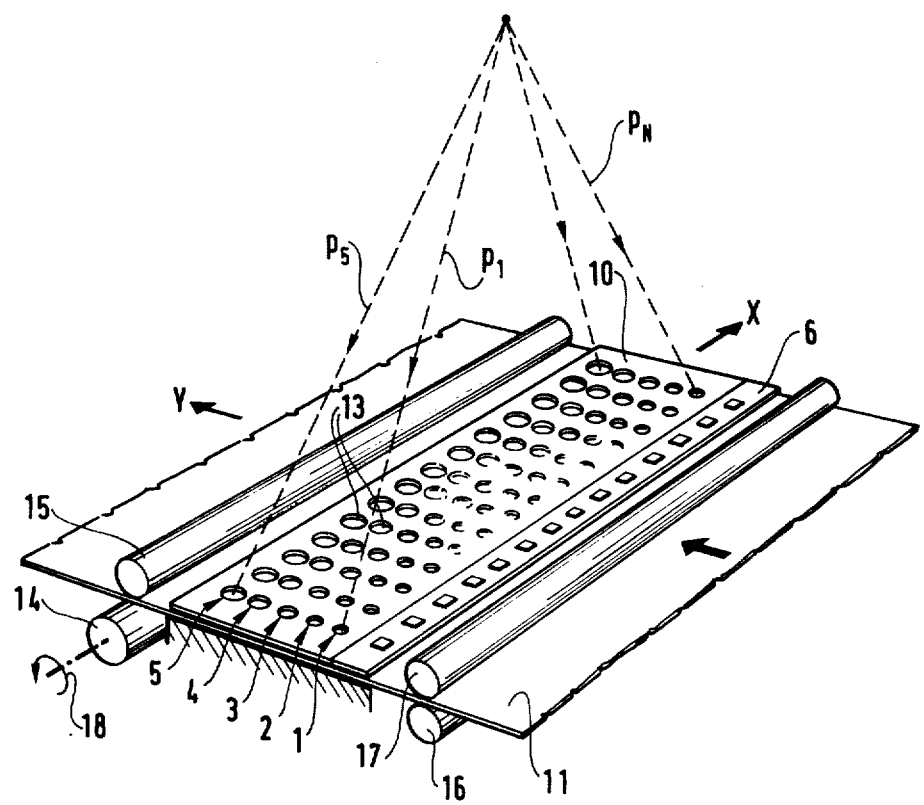
FIG. 1 shows one means for reproducing an image in accordance with the invention.

One mode of implementing means used by the invention to reproduce an image with different grey levels on a photo-sensitive medium or paper is shown diagrammatically on an enlarged scale in FIG. 1. The means comprise a screen 10 which is opaque to a beam of light for printing elementary image points (pixels) on photo-sensitive paper 11, by means of a light beam, e.g. a laser beam. The screen 10 is disposed close to the paper, on the path of a printing light beam. The screen 10 has n rows of apertures or diaphragms such as 13, which are transparent to the light beam and are disposed in N columns over the entire width of the paper or of a zone of the paper on which an image is to be reproduced with N pixels per image line. Over each column the diaphragms are of different sizes. On the screen the rows of diaphragms are spaced at m times the spacing of the image lines, where m is an integer equal to unity or a small number. Thus along each row the diaphragms are spaced at the same spacing as the pixels of an image line, while along each column the diaphragms are spaced at m times the spacing of the image lines.

In the mode of implementation shown, the screen 10 has five rows of diaphragms ($n=5$), with the diaphragms of each row being identical, while those of different columns are different. In this case the rows of diaphragms are labelled 1 to 5, in order of increasing diaphragm size. m has also been defined as being equal to 2: the rows of diaphragms are at twice the image line spacing. By way of example, for an image to be reproduced of width 51.2 mm for reproduction at 5 pixels per millimeter of image line, and with successive image lines at a spacing of 200 $\mu$m between lines, the screen has 256 columns of diaphragms at a spacing of 200 μm between centres, and each constituted by 5 different diaphragms at a spacing of 400 μm, the size of each diaphragm fitting in the space allotted to each pixel (200 μm×200 μm).

Looking at FIG. 1, it will be readily understood that by scanning the photo-sensitive paper 11 on which the image is to be reproduced, using a light beam with a spot on the paper or having a transverse size equal to the size of a pixel, and by inserting the screen 10 on the path of the light beam in the proximity of the paper, it is possible to mark dots of differing sizes on the paper, depending on the size of the diaphragm through which the dot is marked. The paper is kept under tension at least immediately behind the screen 10, for example by means of pairs of rolls 14-15 and 16-17 shown here. The paper is driven in a direction Y by the roll 14, as indicated by the arrow 18, thereby making it possible to scan the paper over its whole length through the screen 10.

FIG. 1 shows the end positions of such a light beam that scans the photo-sensitive paper through the screen 10 in a zone situated behind the screen 10. These positions are referenced p1 to pN for scanning in the X direction along a row of diaphragms, in this case the row 1, and p1 to p5 in a direction perpendicular to X, corresponding to a column of diaphragms, in this case the first column.

FIG. 2 shows one mode of implementing apparatus for reproducing an image on photo-sensitive paper, using a screen such as that shown in FIG. 1. In FIG. 2, the photo-sensitive paper is referenced 11 and the screen having n rows of diaphragms arranged in N columns is referenced 10 as in FIG. 1. The paper is considered to be driven in the direction Y with the screen 10 being fixed.

Likewise in conformity with FIG. 1, the screen is shown having rows of diaphragms 1 to 5, giving n=5.

The apparatus is of the type that scans photo-sensitive paper 11 with a light beam, in this case a laser beam 19, to print pixels defined by different tone levels, in this case grey levels, from data supplied thereto. The binary data comes from the analysis of an original image in lines and by converting the analysis signal into data representative, for each of the N points along a line, of n+1 possible different grey levels, i.e. n different levels of grey other than the background white (or black) given by the photo-sensitive paper on which the image is to be reproduced. This data representative of n+1 possible grey levels per pixel, is considered in this case as being supplied by a data source 20 having as many parallel outputs as there are bits required to define the data concerning one pixel. The bits concerning each successive pixel are delivered simultaneously on the parallel outputs of the source 20 (the parallel outputs being represented by two slashes through the output line from 20). The data concerning successive pixels along an image line is delivered serially.

The image reproducing apparatus includes a data input terminal 21 connected to the data source 20 and having as many parallel inputs, not shown individually, as there are parallel outputs from the source 20 to which they are respectively connected. Connected to the terminal 21 by parallel links represented by a single line with two slashes across it, there are first means 22 for converting the said received data concerning each pixel into a word for the pixel giving the rank r of the diaphragm to be used to define its grey level, i.e. the diaphragm to be used in the column of diaphragms corresponding to the position of the pixel in the X direction (see FIG. 1). The rank r is variable between 1 and 5 and is counted from the first row of diaphragms encountered by the paper as it is driven along the Y direction, in this case the row 1. Since the diaphragms of each row are identical to each other, as shown in FIG. 1, the first means may be constituted for example by a read only memory (ROM) which is addressed by the data received concerning each pixel to deliver the word of the rank of the corresponding diaphragm to be used to define the grey level of each pixel. This word representative of the rank r of the diaphragm to be used in each successive column, is a five bit word in this case (n=5), with only one bit being at level 1 in a position corresponding to the diaphragm to be used when the grey level is different from the background colour of the paper, and with all the bits being at zero otherwise. The word thus constituted is delivered on five parallel outputs from the first means 22.

Second means 23, referred to as processing means, has five parallel inputs and five parallel outputs. The five parallel inputs are connected to respective ones of the parallel outputs from the conversion means 22 to receive the words delivered successively therefrom. For the respective values of r given by the said words under consideration, the processing means applies respective time delays corresponding to the time taken for the paper to move m(r−1) lines relative to the screen. The said second means shown comprises four shift registers 25 to 28 with their inputs connected to respective ones of four of the five parallel outputs from the first means 22, together with one direct connection 24, i.e. a connection that introduces no delay, connected to the fifth output. The outputs of the shift registers and the direct connection 24 are connected to respective outputs of the second means. The shift registers have respective capacities of mN, 2mN, 3mN, & 4mN bits. The shift registers, together with the direct connection 24, relay the level one bits received by each to respective outputs from the processing means with time delays corresponding to 0, m, 2m, 3m, & 4m image lines on the photo-sensitive paper. The processing means 23 is controlled by a clock signal Hp, which provides a shift control signal to the shift registers 25 to 28 at the rate at which data concerning each pixel appears at the data source 20; this is symbolised by the two clock signal outputs applied respectively to the source 20 and to the means 23. The clock signal Hp, referred to as the pixel clock signal, is derived from a base clock 30 generating a clock signal H, as is explained below.

The image reproducing apparatus further comprises a circuit 31 for sequentially selecting the outputs of the processing means 23. The circuit 31 is driven by a selector clock circuit 32 which receives both the signal H as delivered by the clock 30 and an inhibit signal generated in a manner that is explained below. In the absence of an inhibit signal, the circuit 32 delivers five consecutive clock pulses H on five different outputs. In this embodiment the circuit 31 is constituted by five AND gates 34 to 38, each having one input connected to a respective one of the outputs from the processing means 23, and another input connected to a respective one of the five outputs from the selector clock circuit 32. The circuit 31 also has five outputs, and these control an acousto-optical modulator-deflector 40 which receives the laser beam provided by the laser generator 19.

The acousto-optical modulator-deflector 40 is a known type of circuit sold by the firm SORO under the reference MB9 or IM50, and deflects an incident laser beam by diffracting it by means of an ultra-sonic wave in a crystal. It is shown as being composed of a high frequency source 42 which controls deflection of the beam, and a deflector head 41 (including the crystal and an input transducer) for receiving the incident laser beam which is shown as a dot-dashed line coming from the laser 19. The source 42 comprises five oscillators 44 to 48 for delivering signals at different frequencies in the range 200 to 300 MHz. The oscillators 44 to 48 are controlled by the logic levels delivered at respective ones of the outputs of the circuit 31. Their outputs are taken by a common cable 49 to the deflector head 41 where they define five possible working positions of the laser beam as delivered by the deflector head 41, and shown in dashed lines, each position corresponding to a respective one of the five frequencies, together with a sixth, or rest, position of the laser beam delivered by the deflector head, shown in dot-dashed lines, and corresponding to the case when none of the five frequencies is present. For the sake of clarity in the drawing, these six positions are shown as though they are parallel to each other; in practice the laser beam issuing from the deflector head is deviated angularly with respect to the direct beam as a function of the frequency of the wave emitted by the source 42, and the six positions thus diverge from each other as they leave the deflector head.

The acousto-optical modulator-deflector 40 is associated with a circuit 50 for deflecting the laser beam delivered by the deflector head 41 in the X direction parallel to the rows of diaphragms on the screen 10. The circuit 50 is constituted by a mirror 51 mounted to oscillate about an axis 52 disposed to intercept the laser beam delivered by the head 41. The arrangement is such that each of the six above-mentioned positions is reflected in a respective plane, each of which is substantially perpendicular to the screen 10, and each of which passes through the centres of the diaphragms of a respective one of the five rows, or through the longitudinal axis of the space strip (see below). The circuit 50 also includes a mirror drive 53 and a control circuit 54. The drive circuit 53 is connected to the mirror shaft 52 and positions the mirror in response to a control signal received from the control circuit 54. The control circuit 54 may, for example, be constituted by a saw-tooth voltage generator or by a ramp voltage generator, running under the control of clock signals taken from the base clock 30 and arranged to provide a signal whose voltage increases with the deflection of the laser beam along the rows of diaphragms. The mirror drive 53 may, for example, be constituted by circuits known under the names "G-100 PD Optical Scanner" and "CCX-100 Servo Controller" made by General Scanning Inc. These circuits provide highly accurate positioning of the mirror as a function of the received voltage, with a possible excursion of about 20°. In the example described, the extreme values of the voltage delivered by the circuit 54 are chosen so that the laser beam is deflected in the course of one oscillation of the mirror from the beginning to the end of the rows of diaphragms, with extreme angular positions of the beam corresponding respectively to the beginning and to the end of the rows of diaphragms.

In order to verify the positioning of the laser beam along the rows of diaphragms, the screen 10 is provided with a spacing strip 6 (see FIGS. 1 & 2) lying parallel to the rows of diaphragms and disposed outside the set of rows on the row 1 side thereof. In this case the spacing strip is constituted by a row of N photodiodes, or a row of N apertures leading to a single longitudinal photodiode, either case being represented in the drawings by a row of rectangles each disposed in line with a respective one of the columns of diaphragms. In the example described the spacing strip receives the laser beam issuing from the deflector head 41 whenever it occupies the rest position shown by the dot-dashed line.

Finally the apparatus includes circuits for deriving the various clock signals that drive it from the clock 30. The clock 30 applies its signal H to a divide-by-5 circuit 60 (for the case where n=5). The signal delivered by the divide-by-5 circuit is designated H'p, and is applied to a 256 state counter 61 corresponding to the 256 pixels per image line. The output of the counter 61 each time it reaches its 256 state is connected to a monostable 62, which at each passage of the counter 61 through the 256 state delivers an output pulse of duration chosen to coincide with the fly-back time of the laser beam scan. A pulse end detector 63 constituted by an edge detector detects the falling edge of this pulse and resets the counter 61 to zero as symbolized by the signal RAZ. An AND gate 64 has one input connected to the output of the divider 60 and its other input connected via an inverser 65 to the output of the monostable, and delivers an output signal which constitutes the above-mentioned signal Hp, corresponding to the signal H'p except for the duration of the pulse defining the fly-back time. The signal Hp is applied to the data source 20: it defines the rate at which data concerning the successive pixels along each image line are output. The signal Hp is applied to the conversion means 22: it enables conversion of the received data into words corresponding to the rank r of the diaphragms that provide a grey level corresponding to that defined by the input data. The signal Hp is also applied to the processor means 23, i.e. to the illustrated shift registers: it defines the rate at which the respectively received bits are shifted.

The output of the monostable 62 is also connected to the selector clock circuit 32: the pulse defining the fly-back period constitutes the inhibit signal applied to the selector clock circuit 32 and consequently inhibits any sequential selection of the outputs of the processing means 23 by the circuit 31 for its duration. This output of the monostable 62 is further connected to the voltage ramp generating circuit 54: the fly-back duration pulse resets the signal delivered by the circuit 54 to zero, or at least to some reference level, as symbolised by the signal RAZ.

The operation of the apparatus is described below, considering the data available from the source 20 concerning the image to be reproduced to be arranged in successive image lines each scanned in the same direction. The paper on which the image is to be reproduced is chosen to have a light back-ground. The paper is driven at constant speed along the direction Y and is considered to be correctly positioned relative to the screen for reproduction, i.e. the first image line is the line that will be scanned on the paper through the first row of diaphragms 1, with the other rows 2 to 5 then being outside the image reproduction zone. At the beginning of each line the counter 61 is considered to be in its zero state by virtue of the signal coming from the monostable, the voltage ramp given by the circuit 54 is at its low reference level, and the laser beam coming from the deflector head occupies its rest position where it is detected by the first photodiode of the spacing strip 6.

During image reproduction, the data defining pixels on the image line on the paper behind row 1 of the diaphragms are read from the source 20 at the rate Hp. These data concerning successive pixels are converted at the same rate into words that give the rank, within the columns of diaphragms, of the diaphragm assigned to the defined grey level. Each of these words is a five bit word, with all the bits zero if the defined grey level corresponds to the background colour of the paper, or with just one bit at level 1, delivered on the output whose rank is the same as that of the diaphragm assigned to the grey level defined by the data. These words received by the means 23 at the rate of the signal Hp are processed as follows: each 1 level bit on the first output from the means 22 is made available without delay on the corresponding output of the means 23, while the level 1 bits on the other outputs from the means 22 are delayed by the respective shift registers 25 to 28, by a period depending on their lengths before being made available on the corresponding outputs of the means 23. The outputs of the means 23 are examined sequentially to observe the state of each of them. The source 42 delivers a frequency specific to each of the sequentially examined outputs if there is a level 1 present thereon, or it delivers no frequeny if there is no level 1 present, thereby directing the laser beam emerging from the deflector head in the corresponding direction. The mirror then reflects the laser beam to the appropriate diaphragm or to the strip of photodiodes. Thus at each point along a scan line the laser beam is positioned five successive times on a diaphragm or on the photodiode of a given column.

Simultaneously with the data being read at the rate Hp, being converted, the corresponding words being processed, and the laser beam being deflected over all or part of a column of diaphragms and their associated photodiode, the voltage ramp increasing with the signal Hp and delivered by the circuit 54, causes the mirror to oscillate, thereby scanning succesive columns of diaphragms and photodiodes at the rate of the signal Hp. During scanning in the X direction, the content of the counter 61 increases. When its state reaches 256, in the case were N=256, the laser beam is scanning the last column of diaphragms. The monostable 62 is then triggered and interrupts the signal Hp, while causing the voltage delivered by the circuit 54 to return to its low reference level bringing the mirror to its initial angular position.

So long as the signal Hp is interrupted, data are no longer read from the source, and the conversion means 22, the processing means 23 and the selector circuit 31 are no longer driven. The laser beam issuing from the deflector head remains in the rest position and is directed by the mirror onto the photodiode associated with the first column of diaphragms.

The monostable provides the time interval alloted to the beam returning to the beginning of an image line, this time interval may be 2 ms for example with one complete scan of the five rows taking about 18 ms, which corresponds to the paper advancing at a rate one image line every 20 ms. The data concerning the next image line are read from the end of the signal delivered by the monostable.

On the basis of the read data concerning the successive pixels of each line of the image to be reproduced, this apparatus reproduces each image line by combining both a selectable deflection in the Y direction of the printing beam over five pixels belonging to five different image lines, and a continuous deflection of the printing beam in the X direction over the length of each image line, while at the same time the different rows of diaphragms pass successively over each image line. The timing of the printing instants for the pixels of any given line are delayed by the time necessary for the location of the pixel on the paper to appear behind the diaphragm attributed to the grey level to be printed. Thus for each pixel, the printing instant is delayed with respect to the moment at which the corresponding data is read, as a function of the rank r of the diaphragm designated for printing the required grey level for the point being considered, and taking into account the value of the spacing between rows of diaphragms compared to that between image lines. The delay is equal to the time taken by the paper to advance $2(r-1)$ image lines behind the screen for a spacing between rows of diapragms that is double that between image lines.

The present invention has been described with reference to the embodiment shown in the drawings. Naturally, without going beyond the scope of the invention, it is possible to make detail modifications or to replace various means by equivalent means. In particular, independently of the values given above by way of example, the diaphragms of the screen 10, while remaining different from each other along a given column, need not all be identical along any given row. For example successive columns could be arranged head-to-tail. In that case the conversion means 22 could then be constituted by two ROMs, one for converting data concerning pixels at odd numbered positions along the image line into words representative of the rank of the diaphragm alloted to the grey level of each point for one column direction, and the other operating analogously for the even numbered pixels but for columns of diaphragms arranged in the opposite direction. Both these ROMs would receive the data concerning successive pixels along the image lines, and one or the other would be selected by a circuit for detecting odd and even positions along a line as a function of the signal Hp, the delivered words being applied successively to the processing means 23.

The conversion provided by the means 22, and the processing done by the means 23 could also be performed by a computer.

In another variant, the spacing strip 6 for detecting the position of the laser beam in the X direction along the columns of diaphragms could occupy a zone on the screen other than that defined by the rest position of the laser beam emerging from the deflector head after reflection by the oscillating mirror. In this case the spacing strip could be used in conjunction with a permanent, "position indicating" beam, taken from the laser generator upstream from the deflector head, and directed onto the oscillating mirror whence it would be reflected onto the strip.

I claim:

1. Apparatus for reproducing an image on a photosensitive medium, the image being defined by binary data representative of different tone levels of pixels defined as elementary points constituting the image, the apparatus comprising:

a source of light providing a beam for printing the pixels;

means for moving the beam over the medium in an X direction to scan the pixels of an image line;

means for moving the medium in a Y direction substantially perpendicular to the X direction to scan the pixels of different image lines;

a screen located close to the said medium on the path of the beam, said screen being opaque to said beam and including n rows of diaphragms that are transparent to the beam and are arranged in N columns extending substantially parallel to the Y direction, for an image having N pixels per image line, with each one of the n diaphragms of any given column being of a different size from the others in said column to define different half tone dot sizes, the diaphragms of each row being disposed at the spacing of pixels along an image line, and the rows of diaphragms being disposed at a spacing of m times the spacing of the image lines, where m is an integer equal to unity or a small number;

conversion means for converting said data into binary words, each representative of the rank r of the diaphragm to be used to define the tone of each pixel, where the rank r of a diaphragm is its position in the Y direction along its column counting from the first row of diaphragms encountered by the moving medium, and where $1 < r < n$;

processing means for processing said binary words delivered by said conversion means to apply shifts corresponding to the time taken by the medium to move $m(r-1)$ image lines relative to the screen;

and means for deflecting said beam under the control of said processing means to direct the said beam onto those diaphragms of each column whose respective ranks are indicated by said words as delivered by said processing means.

2. Apparatus according to claim 1, including a sequential control circuit for directing the laser beam over the successive diaphragms of each column, said sequential control circuit connecting said processing means to the means for modulating and deflecting the said beam.

3. Apparatus according to claims 1 or 2, wherein said processing means comprises n delay circuits, of different lengths for applying respective delays of 0, m, 2m, 3m, ..., $(n-1)m$ image line durations, said delay circuits respectively connecting n parallel inputs on which each of said words from the conversion means are transmitted in the form of n bits in parallel, to n parallel outputs.

* * * * *